Dec. 22, 1964 A. PICCININI 3,162,813

RADIO RECEIVING APPARATUS WITH A TIGHTLY SEALED FLOATING CASING

Filed Sept. 7, 1962 3 Sheets-Sheet 1

INVENTOR
Arnaldo Piccinini

BY Wenderoth, Lind and Ponack
ATTORNEYS

INVENTOR
Arnaldo Piccinini

BY Wenderoth, Lind and Ponack
ATTORNEYS

Dec. 22, 1964 A. PICCININI 3,162,813

RADIO RECEIVING APPARATUS WITH A TIGHTLY SEALED FLOATING CASING

Filed Sept. 7, 1962 3 Sheets-Sheet 3

INVENTOR

Arnaldo Piccinini

BY Wenderoth, Lind and Ponack

ATTORNEY

United States Patent Office 3,162,813
Patented Dec. 22, 1964

3,162,813

RADIO RECEIVING APPARATUS WITH A TIGHTLY SEALED FLOATING CASING

Arnaldo Piccinini, 286 Via di Tor Cerrara, Rome, Italy

Filed Sept. 7, 1962, Ser. No. 221,979
Claims priority, application Italy, Sept. 18, 1961, 16,828/61; Apr. 18, 1962, 7,571/62
2 Claims. (Cl. 325—361)

The present invention relates to a radio receiving apparatus provided with a tightly sealed floating casing, suitable to render the radio-receiver capable of being used also in water or dusty rooms.

It is known that the radio receiving apparatus provided with self contained feed, and generally embodied by transistorized circuits, are widely used for life in open air, at the seaside, at the lakeside, on the rivers and so on.

The purpose of the present invention is that of allowing the radio receiver to be used also in sea bathing or fresh water bathing.

Of course, an apparatus, embodied according to the teachings of this invention, will be able to be used in damp or dusty climates, operating thus in rain, or on boats or on windy beaches where dust is present.

The basic feature of this invention consists in embodying a particular combination of a radio receiving apparatus with a casing, so as to attain the above disclosed aims, the actual radio receiving apparatus being however able to be used, in its conventional embodiment, with no dimensional increase, or complication, as determined by the waterproof and floating casing.

The present invention is intended to attain a result having a great utility, i.e. to afford the safe use of the radio receiver under normal conditions, and therefore with normal size and structures, when the apparatus is used within the home or anyway out of water or dusty rooms, allowing the same apparatus to be used, coupled to its particular casing, when one wishes to use the radio receiver in water or in dusty or damp space.

In a second embodiment of this invention, the sealingly tight casing forms an integral part of the radio receiver.

This invention will be hereinafter described with reference to the attached drawings showing only by way of non limitative example, two preferred embodiments of the invention itself.

With reference to the drawings, the reference 1 denotes a conventional type radio receiver in its unit, with a self contained dry cell feed, the circuit of said receiver being, generally but not necessarily, a transistorized circuit.

Figure 1:
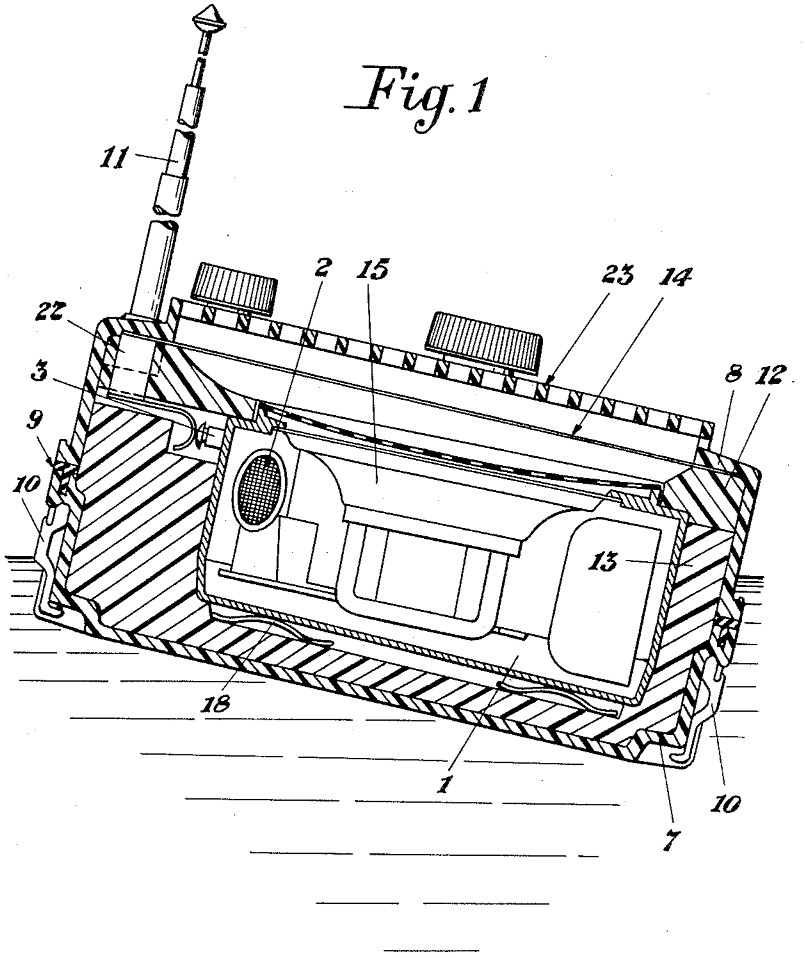
FIG. 1 shows a sectional view of the unit according to this invention, taken according to a vertical plane.
Figure 2:
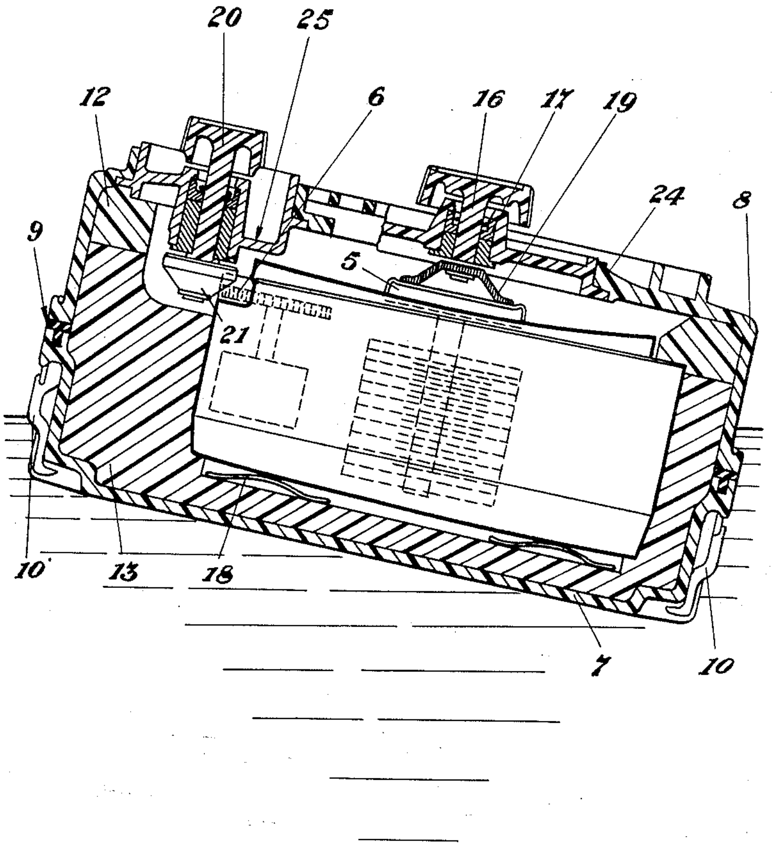
FIG. 2 is a sectional view similar to FIGURE 1, but taken according to the plane passing through the axes of the control outer knobs.

The apparatus can be provided with a ferrite antenna 2, and in this case its casing will be permeable to the electromagnetic waves, or said apparatus could be provided with an outer fishpole antenna 3. In FIGURE 1, reference 15 denotes the loudspeaker, while the tuning control is denoted by 5 in FIG. 2. The adjustment of the volume, with the associated switching on and off is operated by the knob 6 (FIG. 2).

The above described apparatus 1, according to the present invention, is inserted into a casing consisting of two half shells 7 and 8, which can be sealingly tightened on one another, with the interposition of a peripheral packing 9, made of rubber or any other technologically equivalent material. The two half-shells 7 and 8 are tightened by means of devices known per se, for instance lever operated hooks 10, made of sea water resistant material. According to the invention, the location of the apparatus 1 within said, two half shells 7 and 8, as well as the shape and size of the half shells, must be such that when the unit rests on the water, the floating position thereof will be that allowing the ferrite antenna 3 to be over the water level, as shown in FIG. 1.

Obviously, the casing formed by the half shells 7 and 8 is made of a material which is perfectly permeable to radio waves.

If the apparatus operates also with a fishpole antenna 3, the floating position must be such that said antenna or a fishpole 11 connected thereto may project from the casing through a zone non immersed in the water, in order to attain a perfect insulation. This is necessary also when the apparatus operates both with an incorporated ferrite antenna, and with a fishpole antenna.

The aim of obtaining a particular floating position is attained by suitably fixing the location of the actual receiver inside the casing, so that the center of gravity of the unit will be suitably aligned with respect to the center of buoyancy, the alignment being suitably spaced apart from the axis of symmetry, on the side opposite to that where the fishpole or ferrite antenna is located.

Thus the buoyancy and the gravity will be balanced when the unit is suitably inclined with respect to the water level, so as to have the zone with the ferrite or fishpole antenna more emergent from the water.

Always according to the teachings of this invention, the casing which will be, of course, made of water proof material, will also be embodied so that the actual apparatus will have a well established position, and also the volumes occupied by the air will be reduced to the minimum by means of very light fillers denoted by the references 12 and 13.

The function of these fillers, which generally will be embodied by closed cell expanded polystyrene, and in any case by a non porous very light substance, is to reduce to a minimum the amount of air enclosed within the casing. The purpose is to reduce to a minimum the action on the membrane 14 carried by the upper half shell 8 due to the volume expansion or shrinkage of the air contained within the casing, when changes of temperature occur.

According to this invention, the loudspeaker 15 contained in the apparatus 1, normally mounted as shown in the figure, delivers to the outside the sounds through the membrane 14, as the filling material 12 associated with the upper half shell 8 is so shaped as not to obstruct the passage of the sound vibrations from the loudspeaker to the aforesaid membrane 14.

Particularly the extension of said membrane will be as great as possible compatibly with the size of the casing (half shell 8) so that it will be possible to transmit the sound energy through a front surface as great as possible, and therefore with a minor loss of efficiency, and said membrane will be protected by a suitable network 23.

The membrane 14 consists of a very light material, a very thin layer, although being perfectly waterproof. Flexible substances, very tough and highly resilient will be preferred, provided that said substances have slight elongation under the action of a pressure exerted onto the membrance.

Only by way of non limitative example it is possible to indicate as suitable materials for this membrane, polyvinyl chloride, cellulose acetate, polyethylene, nylon, etc. Also suitable, although less advisable, is rubber due to its remarkable elongation, whereby even reduced variations of internal pressure will induce remarkable deformations.

The radio receiver contained within the casing described above, will have to be operated, and for this purpose, the half shell 8 is provided with members which, although ensuring the tight seal, will be able to transmit mechanical actions on to the adjusting members of the apparatus.

By way of example, in FIG. 2 reference 16 has been denoted an "outer" knob which by its spindle inserted into the gland 17, is capable of acting on the tuning knob 5 of the receiver 1 located within the casing.

This result is obtained because the receiver 1 is pushed by the elastic elements 18 (elastic pads, metal springs or the like) against the counter-knob 19, so that the friction between the counter knob 19 and the knob 5 will be sufficient to transmit the movement of rotation.

A similar result could be obtained if the counter knob 19 would be pushed against the knob 5 by a spring acting on the spindle connected to the knob 16.

Another way, also by friction, for coupling the inner knob to the outer knobs consist in making the counter knobs of elastic material, for instance of rubber, so that when the half shells are closed, said counter-knobs will be compressed and therefore urged against the inner knobs to which, by friction, the counter knobs must transmit the movement.

Likewise, the outer knob 20 to operate the switch and the volume adjustment, is connected to the corresponding knob 6 of the actual radio receiver, by means of a counter knob 21 which is pushed against the knob of the receiver either by a spring or by an elastic element 18 located under the radio receiver.

Obviously, the coupling between the inner members of the actual receiver and the operative members located outside of the half shells of the casing, might be embodied, always keeping safe the seal, in very different ways, and for any controls and adjusting members, without departing from the scope of the present invention.

If the receiver is provided with a fishpole antenna 3 (FIG. 1) no difficulty arises for embodying the coupling between the fishpole antenna, which in this case will not be extracted from the apparatus, and an outer fishpole antenna 11 capable of being applied to the casing.

For this purpose, in register with the fishpole antenna incorporated within the actual radio receiver it is possible to provide a contact metal element 22, passing in a perfectly tight way through the insulating casing and capable of receiving the outer fishpole antenna.

In order to render easy the use of the apparatus, in the zone thereof emerging from the water, and accordingly generally on the half shell 8, the transparent zones 24 and 25 are provided, through which the operator may observe the graduated scale of the inner apparatus, or the indication of switched-on apparatus connected to the switch-volume knob.

Figures 3, 4:
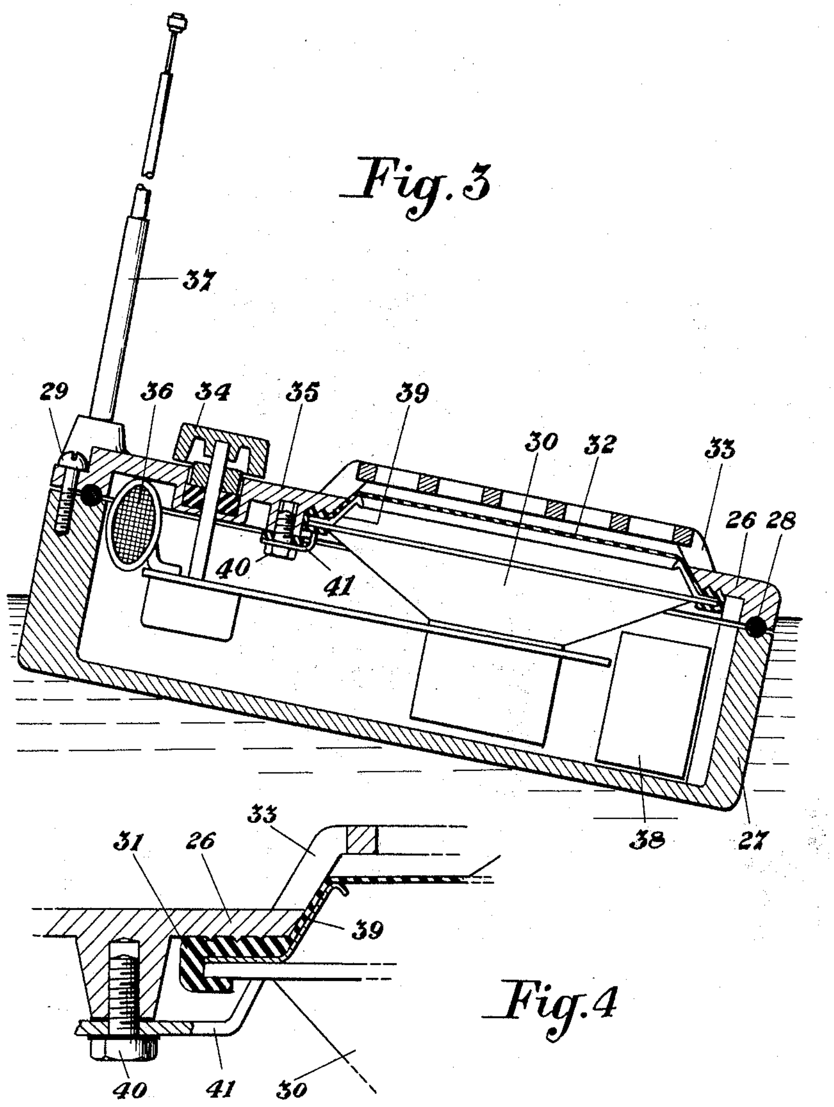
FIG. 3 is a view similar to FIGURE 2, showing a second embodiment of this invention, according to which the casing forms an integral part of the radio receiving set.
FIG. 4 shows in enlarged scale and in sectional view, the detail of the sealed closure of the loudspeaker of the apparatus of FIGURE 3.

FIGURE 3 shows in sectional view, a second embodiment of this invention, wherein the tightly sealed casing constitutes an integral part of the apparatus. As in the previously described case, the ferrite antenna 36, which is shown in sectional view, is out of the water level when the apparatus is in its normal floating position.

The knobs 34 project from the casing in the non wet zone, and the loudspeaker 30 has its mouth always in the zone above the floating line.

A membrane 32 made of waterproof material, very thin, and having an absorbing power uniform for the various frequencies, prevents the water from coming into contact with the cone of the loudspeaker 30.

The casing consists of two half shells 26 and 27. These perfectly mate along their peripheries with the interposition of a rubber (or similar material) packing 28.

The connection between the two half shells is ensured by the screws 29 engaging the half shell 27.

To the loudspeaker 30 is applied a metal frame 39, and on this frame is taut the rubber membrane 32 which, along the circular periphery, surrounds the edge of the loudspeaker and the frame, so as to connect said elements to one another.

When the loudspeaker is tightened against the half shell 26, by means of three or more screws 40 and as many bent members 41, the rubber packing 31 is compressed against the surface of the half shell provided with grooves concentrical to the loudspeaker obtaining thus a perfect peripheral seal, as shown in FIG. 4.

The membrane 32, due to the frame 39 reaches a level projecting from the outer plane of the half shell 26, and this membrane will be protected by a grate 33, projecting outwardly with respect to said outer surface of the half shell.

Thus the water which might fall onto the membrane 32 will be discharged through the grate 33, for any position of the apparatus.

The spindle of the tuning or volume adjusting knob 34 passes into the casing, and particularly inside the half shell 26, through a normal packing gland 35, the recess for which is provided within said half shell 26.

In FIG. 3 the knob 34 is that controlling the volume adjusting potentiometer, but the disclosure concerning this knob is valid for any knobs.

The ferrite antenna 36 shown in sectional view is supported by the normal frame which usually is of the printed circuit type and which must be located in the position corresponding to the lightest part of the apparatus, i.e. that which in any case emerges from the water.

For the possible fishpole antenna 37 destined to receive the short waves and the frequency modulated emitters, it is necessary to provide a stuffing box output, also in the "lightest" zone of the apparatus. The dry cells 38 or the like are located in the immersed zone and contribute by their weight to the desired distribution of masses.

I claim:

1. A floating detachable water-tight casing for portable radio sets having conventional loudspeaker, antenna, tuning scale and control knobs, comprising in combination a lower portion, an upper portion, a rubber packing between said lower and upper portion, hooks arranged at opposite sides of said casing for sealingly connecting said portions with one another, an inner lining arranged within said casing and having a recess for receiving a radio set, a first control means sealingly arranged on said upper portion for engaging one of the control knobs of said radio set, a second control means sealingly arranged on said upper portion for engaging the other control knob of the radio set within said casing, a sound transmitting waterproof membrane rigidly fixed to said upper portion above the loudspeaker of said radio set, a grate provided on said upper portion above said membrane for allowing propagation of sound through said membrane, an antenna sealingly fixed to said upper portion of said casing and operatively connected with the antenna of said radio set, said recess receiving said radio set being provided eccentrically to the geometrical center of said casing to shift the center of gravity of said casing with said radio set towards the side opposite to said casing antenna for raising the last above the water level, spring means being provided on the bottom of said recess for pushing the control knobs of the radio set into operative engagement with said first and second control means respectively, and a transparent zone being provided on said upper portion of said casing for observing the tuning scale of the radio set.

2. A casing as claimed in claim 1, wherein said control means for adjusting the control knobs of the radio set comprise an outer knob, an inner knob within said casing for frictionally engaging the corresponding control knob of the radio set, and a spindle rigidly connecting said outer knob with said inner knob, a gland being provided for sealingly arranging said spindle in the upper portion of said casing.

References Cited by the Examiner

UNITED STATES PATENTS

| | | | |
|---|---|---|---|
| 2,397,844 | 4/46 | Dewhurst | 325—116 |
| 3,032,651 | 5/62 | Gisiger-Stahli et al. | 325—352 |

OTHER REFERENCES

McAdam: "New Design of CXKC Pocket Radio Receiving Set," U.S. Navy Elec. Lab., San Diego, California—Report 425, Jan. 11, 1954, 14 pages.

DAVID G. REDINBAUGH, *Primary Examiner.*